United States Patent [19]
Hong

[11] Patent Number: 5,559,497
[45] Date of Patent: Sep. 24, 1996

[54] BODY TEMPERATURE SENSING AND ALARMING DEVICE

[76] Inventor: Chia-Ping Hong, P.O. Box 1750, Taichung, Taiwan

[21] Appl. No.: 345,944

[22] Filed: Nov. 28, 1994

[51] Int. Cl.⁶ .................................................. G08B 23/00
[52] U.S. Cl. ........................ 340/573; 340/584; 340/586; 128/736
[58] Field of Search .................... 340/573, 584, 340/586; 128/736

[56] References Cited

U.S. PATENT DOCUMENTS

| | | | |
|---|---|---|---|
| 4,205,671 | 6/1980 | Lassen | 340/573 |
| 4,278,970 | 7/1981 | Streczyn et al. | 340/573 |
| 4,297,685 | 10/1981 | Brainard, II | 340/573 |
| 4,679,036 | 7/1987 | Cheng | 340/573 |
| 4,819,860 | 4/1989 | Hargrove et al. | 340/573 |
| 4,865,044 | 9/1989 | Wallace et al. | 340/573 |

*Primary Examiner*—Jeffery Hofsass
*Assistant Examiner*—Benjamin C. Lee

[57] ABSTRACT

A device is attached to various portions of the human body for detecting body temperature and includes a sensor for sensing body temperature, and a converter for converting the body temperature into a reference value. The reference value is transmitted into a comparator which compares the reference value with another reference value. When the body temperature is increased for more than a predetermined value, an alarm will generate an alarm signal for alarming that the body temperature is too high.

1 Claim, 4 Drawing Sheets ent invention;

BODY TEMPERATURE SENSING AND ALARMING DEVICE

BACKGROUND OF THE INVENTION

1. Field of the Invention

The present invention relates to a temperature sensing device, and more particularly to a body temperature sensing and alarming device.

2. Description of the Prior Art

Typically, clinical thermometers are required for measuring the body temperature. Particularly, when taking care of babies, the parents and the nurses should measure the babies' temperature frequently with the clinical thermometers so as to know whether the babies have a temperature or not. This is inconvenient particularly in the night.

The present invention has arisen to mitigate and/or obviate the afore-described disadvantages of the conventional body thermometers.

SUMMARY OF THE INVENTION

The primary objective of the present invention is to provide a device for sensing the body temperature and for generating alarm signals when the body temperature reaches a predetermined value.

In accordance with one aspect of the invention, there is provided a device comprising means for sensing body temperature, comparator means coupled to the sensing means and including a reference value and a predetermined value for comparing the body temperature with the reference value, and alarming means coupled to the comparator means for generating alarm signals when the body temperature reaches an adding value of the reference value and the predetermined value.

In accordance with another aspect of the invention, there is provided a device comprising means for sensing body temperature, a first converting means for converting the body temperature into a first reference value, a second converting means for converting the body temperature into a second reference value, comparator means coupled to the first and the second converting means for comparing the first reference value with the second reference value, and alarming means coupled to the comparator means for generating alarm signals when the first reference value is higher than the second reference value for a predetermined value.

In accordance with a further aspect of the invention, there is provided a device comprising means for sensing body temperature, a first converting means for converting the body temperature into a first reference value, adder means coupled to the first converting means for adding a predetermined value to the first reference value so as to form a second reference value, a second converting means for converting the body temperature into a third reference value, comparator means coupled to the adder means and the second converting means for comparing the third reference value with the second reference value, and alarming means coupled to the comparator means for generating alarm signals when the third reference value reaches the second reference value.

In accordance with still another aspect of the invention, there is provided a device comprising means for sensing body temperature, means for converting the body temperature into a first reference value, adder means coupled to the converting means for adding a predetermined value to the first reference value so as to form a second reference value, comparator means coupled to the adder means and the converting means for comparing the first reference value with the second reference value, and alarming means coupled to the comparator means for generating alarm signals when the first reference value reaches the second reference value.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
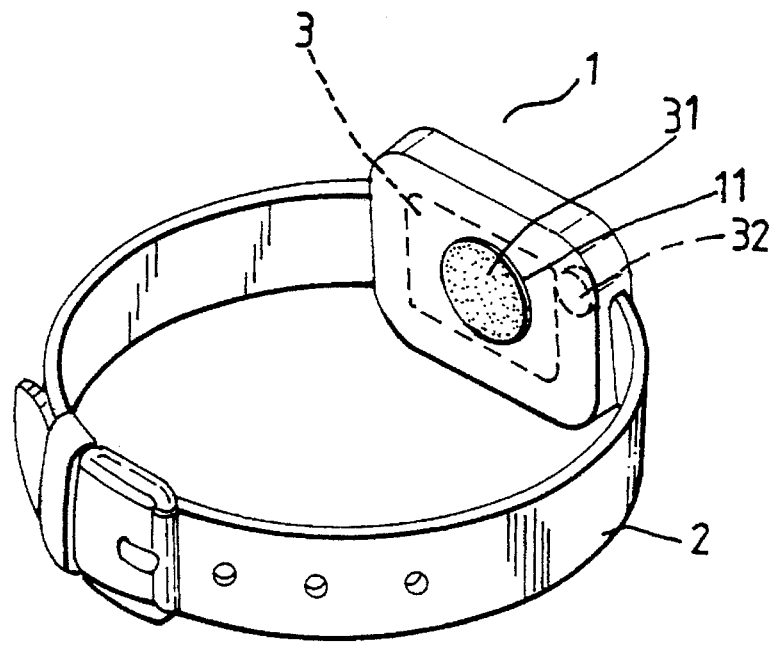
FIG. 1 is a perspective view of a body temperature sensing and alarming device in accordance with the present invention.
Figure 2:
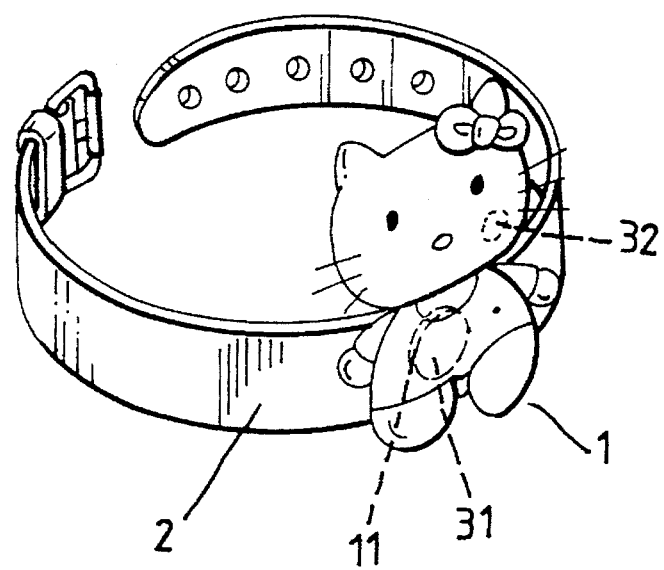
FIG. 2 is a perspective view illustrating another application of the body temperature sensing and alarming device in accordance with the present invention.

Referring to FIG. 1, a body temperature sensing and alarming device in accordance with the present invention comprises a housing 1 attached to the human body by a belt means 2. It is preferable that the belt means 2 may attach the housing 1 to the wrist portion of human body. The housing 1 may include a parallelepiped body as shown in FIG. 1, or may be formed to a toy shape as shown in FIG. 2. Similarly, the housing 1 may be formed into various kinds of shapes for attracting babies. A control device 3 is disposed in the housing 1 and includes a sensor 31 for contacting with the human body and for sensing body temperature, and an alarm device, such as a buzzer 32 for alarming people when the sensor detects a body temperature higher than a predetermined value. A packing or a pad 11 may be provided between the sensor 31 and the housing 1 so as to prevent the sensor 31 from contacting with other objects, such that the sensor 31 may exactly detect the body temperature.

Normal body temperature is 36.5° C. However, the body temperature in the wrist portion is slightly lower than 36.5° C. and normally ranges from 28° C. to 36° C. When the body temperature sensing and alarming device in accordance with the present invention is attached to the wrist portion, the sensor 31 should be calibrated to sense the body temperature in the wrist portion, which will be described hereinafter. The device may also be attached to other portion of the human body including waist portion, feet, etc.

Figure 3:
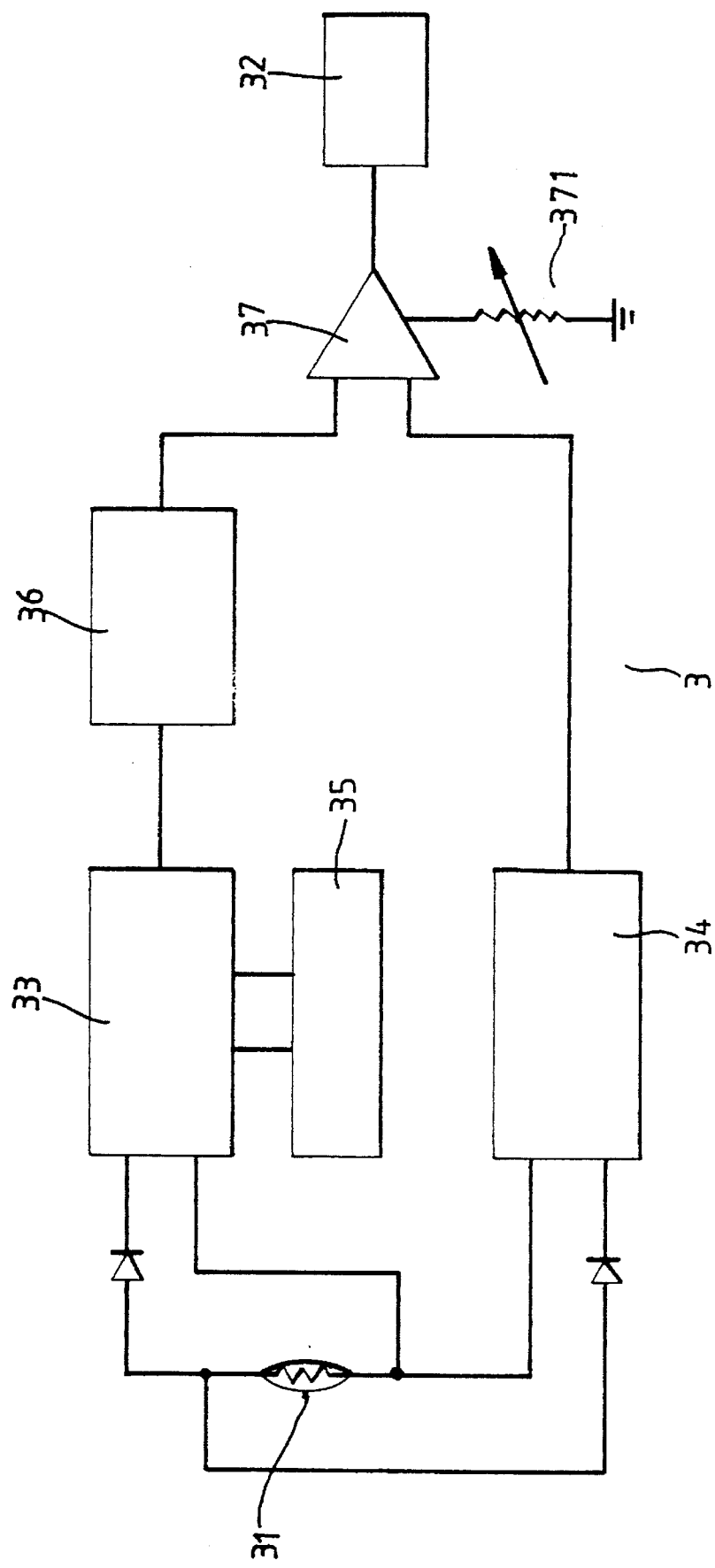
FIGS. 3, 4 and 5 are block diagrams illustrating three applications of the control circuit for the body temperature sensing and alarming device.

Referring next to FIG. 3, the control device 3 includes a sensor 31, two temperature/voltage converters 33, 34 coupled to the sensor 31, a delay circuit 35 coupled to one of the converters 33, a locking circuit 36, a comparator 37 coupled to the other converter 34 and to the locking circuit 36, an adjusting member 371 coupled to the comparator 37, and the buzzer 32 coupled to the comparator 37.

When the device is attached to the wrist portion of the human body, the sensor 31 may detect the body temperature, the converters 33, 34 may convert the body temperature into voltage, for example, 1° C. may be converted into 1 mv. The reference voltages for the wrist portion will thus be ranged from 28 mv to 36 mv. The delay circuit 35 is coupled to the converter 33 for controlling the converter 33 to convert the body temperature into voltage within a predetermined time interval, preferably ranging from one to two minutes. The converted voltages within this time interval are locked in the locking circuit 36 and provided to the comparator 37 as a reference value. When the body temperature is increased for a predetermined value, 0.6° C. or 0.6 mv for example, the comparator 37 may energize the buzzer 32 right away so as to generate an alarm signal.

Figure 4:
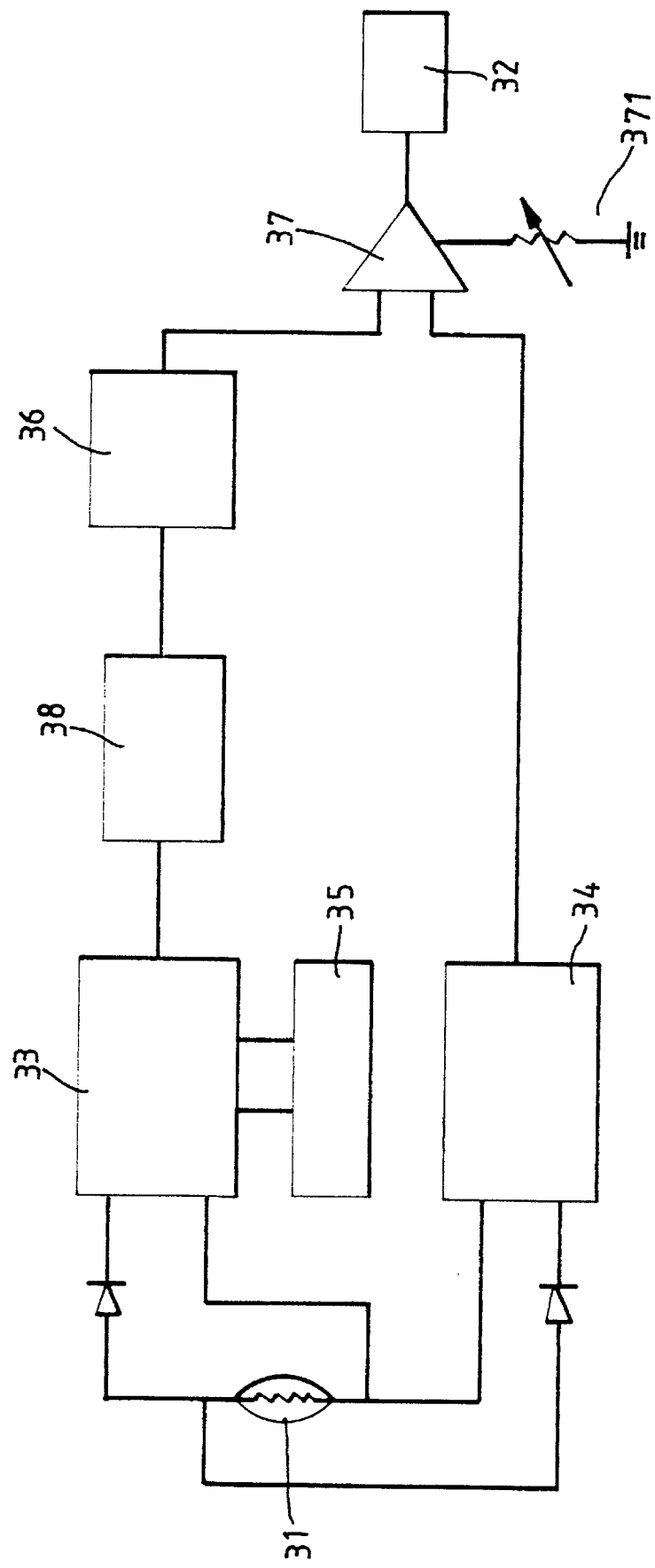

Referring next to FIG. 4, an adder 38 is further provided between the converter 33 and the locking circuit 36 for adding a predetermined value, 0.6° C. or 0.6 mv for example, to the converted value before the converted value is transmitted into the comparator 37. The reference value will thus be the converted value and the predetermined value of the adder 38. In this case, when the detected body temperature reaches the reference value, the buzzer 32 will be energized for alarming purposes.

Figure 5:
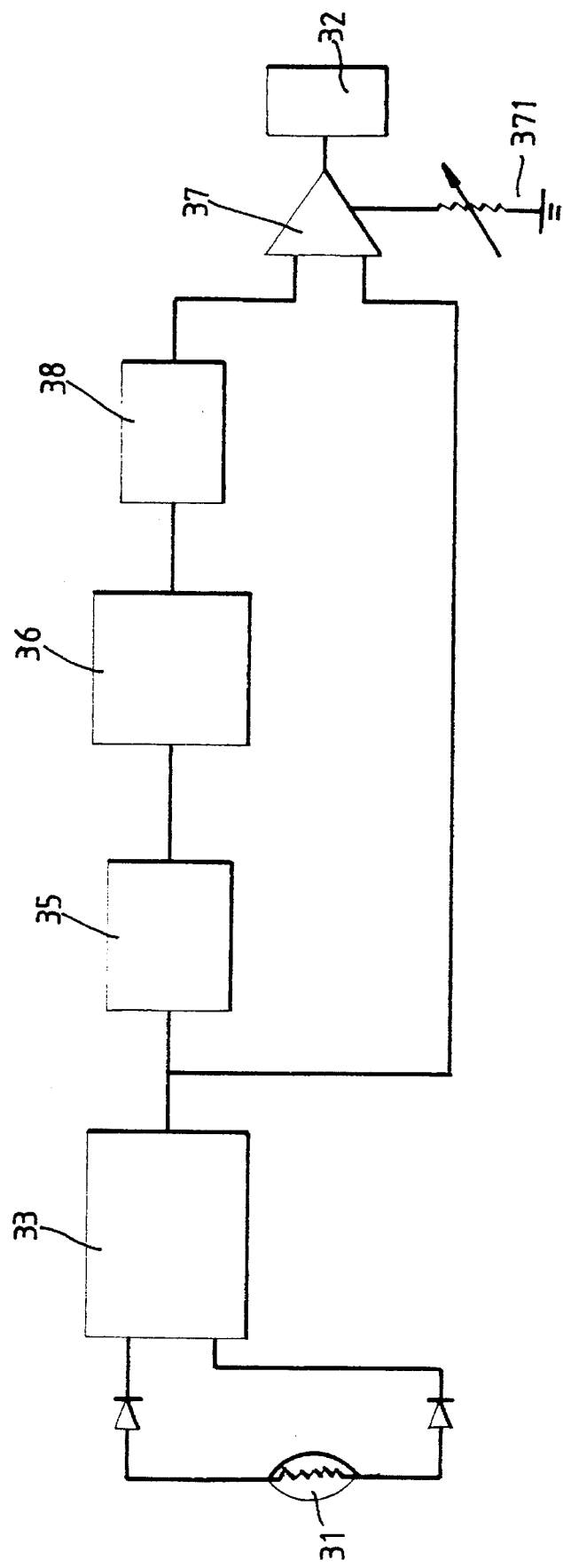

Referring next to FIG. 5, in this embodiment, only one converter 33 is used and coupled to the delay circuit 35 and the comparator 37. An adder 38 is coupled between the locking circuit 36 and the comparator 37. In this embodiment, the converted voltage from the converter 33 is directly transmitted to the comparator 37 as a reference value, and is added with the value of the adder 38. When the detected body temperature reaches the sum of the reference value and the predetermined value, the buzzer 32 will be energized for alarming purposes.

Accordingly, the body temperature sensing and alarming device in accordance with the present invention may be attached to the human body for detecting the body temperature and for generating alarm signals when the body temperature increases more than a predetermined value.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A device comprising:
    means for sensing body temperature and outputting temperature signals over time,
    a first converting means for converting a sensed body temperature signal into a first reference value,
    adder means coupled to said first converting means for adding a predetermined value to said first reference value so as to form a second reference value,
    a second converting means for converting a sensed body temperature delayed in time from said body temperature signal converted by said first converting means into a third reference value,
    comparator means coupled to said adder means and said second converting means for comparing said third reference value with said second reference value, and
    alarming means coupled to said comparator means for generating alarm signals when said third reference value reaches said second reference value.

\* \* \* \* \*